TOKEN DEVICE

Filed Jan. 19, 1961 2 Sheets-Sheet 1

INVENTOR.
Thomas R. Smith,
BY
William G. Landwier
AGENT

INVENTOR.
Thomas R. Smith
BY
William G. Landwier
AGENT

United States Patent Office 3,136,402
Patented June 9, 1964

3,136,402
TOKEN DEVICE

Thomas R. Smith, Newton, Iowa, assignor to The Maytag Company, Newton, Iowa, a corporation of Delaware
Filed Jan. 19, 1961, Ser. No. 83,677
4 Claims. (Cl. 194—4)

This invention relates to token operated devices, and more particularly, to the utilization of tokens having electrically conductive areas for completion of an electrical circuit in order to initiate actuation of a device.

While cards, or tickets, containing electrically conductive portions for actuation of the device have been used previously, as for example in the patents to Osteen 2,073,904, and Noregaard 2,794,869, there have been several problems. Either the electrically conductive area is exposed to an observer, so that it is readily susceptible to counterfeiting, or it is covered by material, in order to conceal its location, which must be pierced for operation. Counterfeiting must be prevented. At the same time, the cards, or tickets, and the entire system must be reliable and yet not be prohibitively expensive.

It is an object of the present invention to provide a system, and tokens usable therewith, for the actuation of a device which is simple in operation and yet comparatively inexpensive to manufacture. It is a further object of the invention to provide a system operable by electrically conductive areas in a token that is difficult to counterfeit. It is a still further object of the invention to provide a token operated system in which the token is invalidated to prevent reuse. It is a yet further object of the invention to provide a disposable token for a token operated device. It is another object of the invention to provide a token operated device with reliable protection against tampering. Further objects and advantages of this invention will become evident as the description proceeds and from an examination of the accompanying drawing which illustrates one embodiment of the invention and in which similar numerals refer to similar parts throughout the several views.

Figures 1, 2:
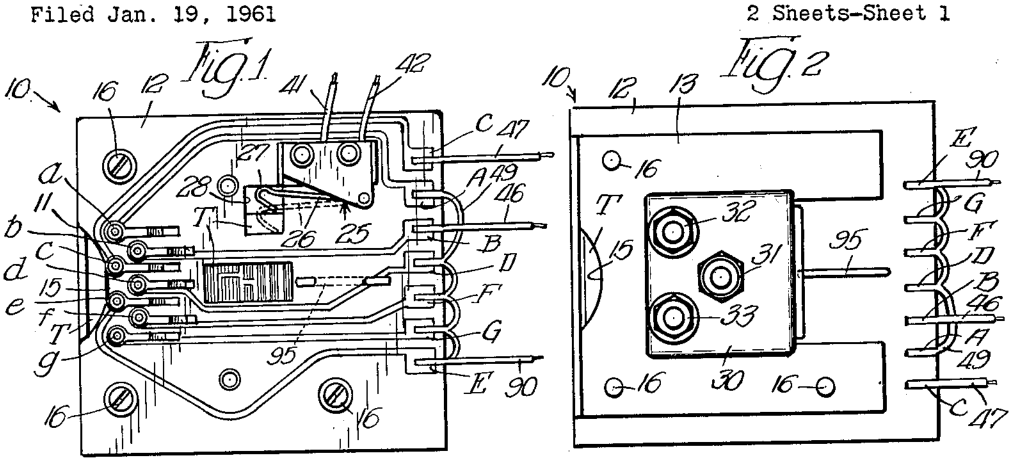
FIGURE 1 is a top plan view of a token receiver embodying the present invention.
FIGURE 2 is a bottom view of the token receiver of FIGURE 1.
Figure 3:
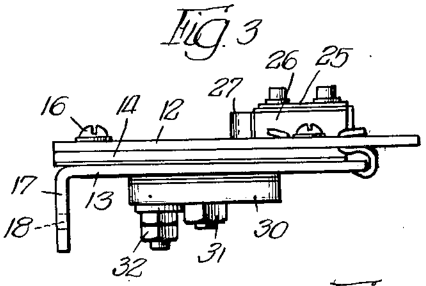
FIGURE 3 is a side view of the token receiver of FIGURE 1.
Figure 4:
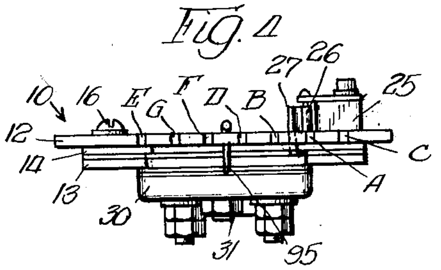
FIGURE 4 is a rear view of the token receiver of FIGURE 1.
Figure 5:
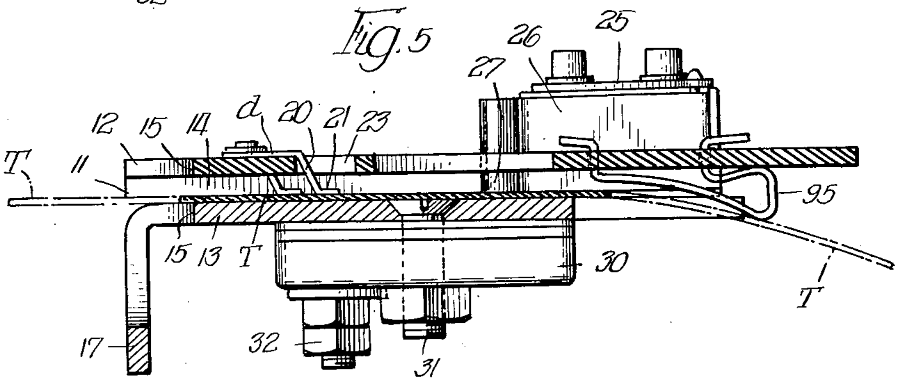
FIGURE 5 is an enlarged view in longitudinal section of the token receiver of FIGURE 1.

Referring now to FIGURE 1 of the drawing, there is illustrated a token receiver 10 having a top wall 12 in the form of a printed circuit board. A bottom wall 13 is spaced from the top wall 12 by spacer elements 14 located at each side of the slot 11. The assembly is held together by screws 16. The top and bottom walls 12 and 13 may be formed with a semi-circular recess 15 at the slot 11 to facilitate insertion of the token. As best shown in FIGURE 5, a guide 95 at the rear of slot 11 deflects the used token downwardly into a receptacle (not shown) when another is inserted.

Mounted on the top wall 12 are a number of electrical contacts *a*, *b*, *c*, *d*, *e*, *f*, and *g*. As best illustrated in FIGURE 5, each of the electrical contacts *a* through *g* has a downwardly projecting spring leg 20 which terminates in a bent-end in the form of a foot 21 for engaging the upper face of the inserted token T. The electrical contact projects through an opening 23 into the slot 11 between top and bottom walls 12, 13.

As shown in FIGURE 1, the top wall 12 of the token receiver 10 is in the form of a printed circuit board which establishes electrical connections between each of the electrical contacts *a* through *g* and corresponding terminals A through G at the inner end of the board. As illustrated, each of the electrical contacts *a* through *g* is electrically connected by printed circuitry to terminals A through G at the opposite end of the top wall 12. Terminals A and D through G are all connected together by jumper leads 49 to lead 90. Terminal B is connected to lead 46. Terminal C is connected to lead 47.

Figure 6:
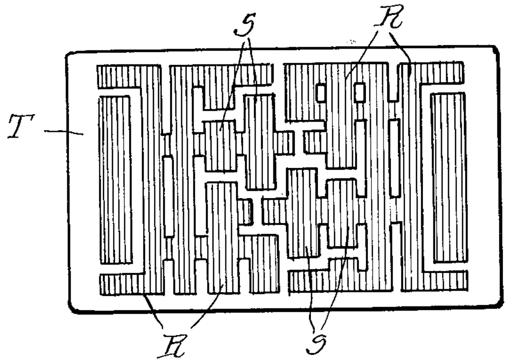
FIGURE 6 is an enlarged top plan view of the token of the present invention adapted to be used with the receiver of FIGURE 1.

Referring now to FIGURE 6 of the drawing, the token T employed in the present invention has on at least one face thereof electrically conductive material in certain areas. The token may be in the form of a ticket, or card. The card has a printed circuit S of electrically conductive material on at least one face thereof, so as to be engaged by at least some of the electrical contacts *a* through *g*. The electrical contacts complete an electrical circuit through the circuit S on the face of the card in order to control operation of the device, as will be explained more fully hereinafter. For this reason, the conductive material is in a pattern which corresponds to the arrangement of the electrical contacts. For example, in FIGURE 6, the electrically conductive material S is of dendroidal configuration, so as to make electrical connections between electrical contacts *b* and *c*.

In order to prevent ready counterfeit duplications of the printed circuit card T with the electrical conductive material S, the face of the card may additionally contain printed material R which is electrically non-conductive, such as printing ink, in order to disguise and conceal the location and design of the electrically conductive material S. By choosing suitable designs of R and S the conductive area may be camouflaged.

The base sheet of the printed circuit card T is preferably disposable, so that it can be invalidated. For this purpose it may be made of a heat deformable material, such as a thermoplastic, having a plasticizing temperature in a range which permits it to be deformed by a heating element mounted in the receiver.

Mounted on the top wall 12 of the receiver 10 is a switch 25. The switch is actuated by pivotal arm 26. At one end of the arm 26 is a depending finger 27 which projects through opening 28 in the top wall 12. The finger 27 is abutted by an inserted token T, so as to move the arm 26 to actuate the switch.

In order to invalidate the token a heater 30 is secured to the bottom wall 13 of the receiver through screw 31. The heater 30 is energized by supplying a source of electrical power to terminals 32, 33 controlled by switch 25. Switch 25 is actuated by an inserted token T to complete the circuit to the power source for heater 30. Since the token T may be formed of a heat deformable material, such as thermoplastic substance, when the heater is energized the inserted token will be rendered plastic, distorted, and invalidated. After the token is distored by the heater it tends to shrink and contract, permitting the arm 26 of switch 25 to return to the normal position shown by the dotted lines in FIGURE 1, and de-energize the heater circuit.

Figure 7:
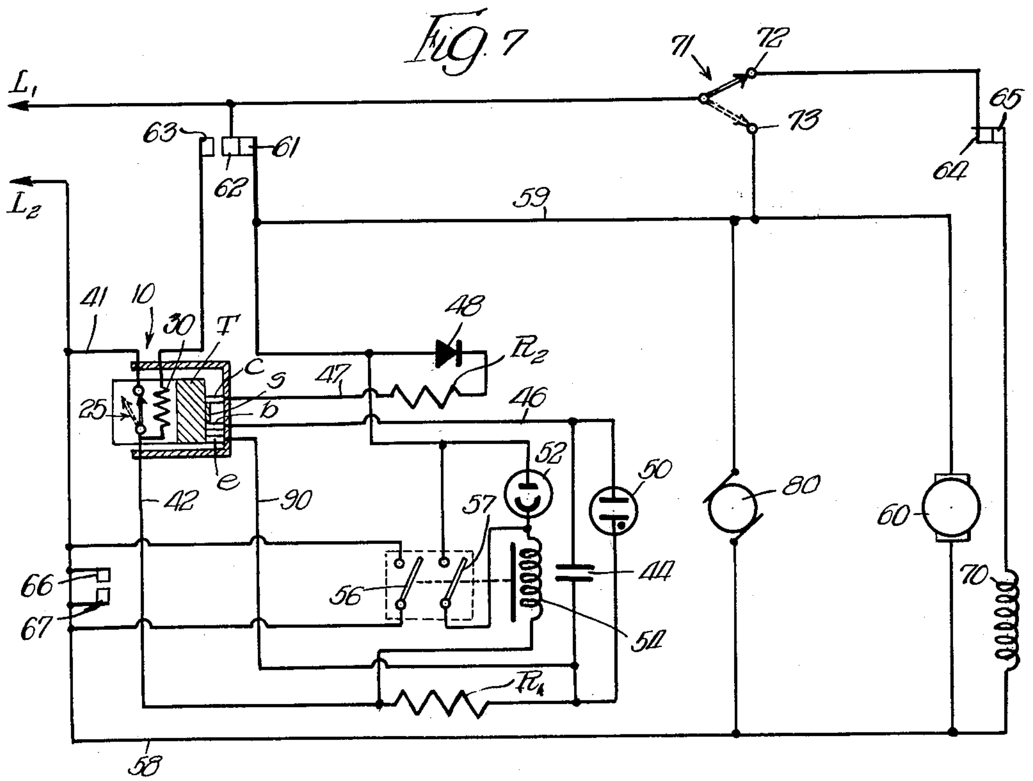
FIGURE 7 is a diagram of the control circuitry of the present invention.

Referring now to FIGURE 7, by way of example, the invention will be described in connection with a control for an automatic washing machine. It will be understood, however, that the invention may be employed with other token operated devices.

The source of power is supplied through lines $L_1$, $L_2$, such as 110 volts, 60 cycle alternating current. Switch 25 is normally open, as illustrated by the dotted line position in the drawing. When a token T is inserted in the receiver 10, switch 25 is moved to the full line position to complete a relay actuation circuit.

The relay actuation circuit is from power line $L_2$, lead 41, switch 25, lead 42, and thence through resistor $R_1$ to one side of the capacitance 44. The other side of the capacitance 44 is connected to power line $L_1$ through a circuit completed between electrical contacts *b*, *c* through electrical conductive material S on the face of token T as previously indicated. The circuit is from line 46, contact *b*, through the conductive material S, electrical contact *c*, line 47, resistor $R_2$, selenium half-wave rectifier 48, and timer switch contact 61, 62 (normally closed at the start of the cycle of operation) to power line $L_1$. Connected in parallel to the condenser 44 is a neon gas tube 50. The resistors $R_1$, $R_2$ in series with the condenser 44 are of a sufficiently high value to keep the current in the circuit of electrical contacts *b*, *c* and switch 25 below dangerously high levels to prevent hazards to persons inserting the card T. The resistors, however, allow the charge one the condenser 44 to build up during a period of time of from one to six seconds to an amount sufficiently high to fire the neon gas tube 50. The neon gas tube 50 is designed to fire in a range from about 68 to 76 volts, so that when the charge on condenser 44 has achieved this amount, after a period of time determined by resistors $R_1$, $R_2$ through recognized capacitance-resistance principles, the gas tube 50 fires.

A light responsive resistor, such as a photo-electric cell 52, is positioned at a location to be illumined by the neon gas discharge tube 50. The photo-electric cell 52 is connected on one side to power line $L_1$ through cam switches 61, 62 (closed at the beginning of a timing cycle). The other side of the photo-electric cell is connected to power line $L_2$ through a relay 54, line 42, switch 25, and line 41. The photo-electric cell 52 has a very high resistance when dark. However, when illuminated its resistance is reduced to low value so that the relay 54 is energized and actuated. When the relay 54 is energized it closes switch contacts 56 and 57. Relay switch contact 57 completes a holding circuit in parallel to the photo-electric cell 52 to maintain the relay 54 energized. Relay switch contact 56 completes a circuit for energizing an automatic control for a washing machine.

The washing machine automatic control will now be described. Relay switch 56 closes a circuit to line 58 in order to energize a number of units in the washing machine, for example, timer motor 60, fill solenoid 70, and drive motor 80. The other side of the timer motor 60 and drive motor 80 are connected to power line $L_1$ through line 59, and timer switch contact 61, 62 (closed at the beginning of the timing cycle). The other side of the fill solenoid 70 is connected to power line $L_1$ through timer switches 64, 65 and float switch 71. (Both switches 64, 65 and 71 are normally closed at the beginning of the timing cycle.)

Figure 8:
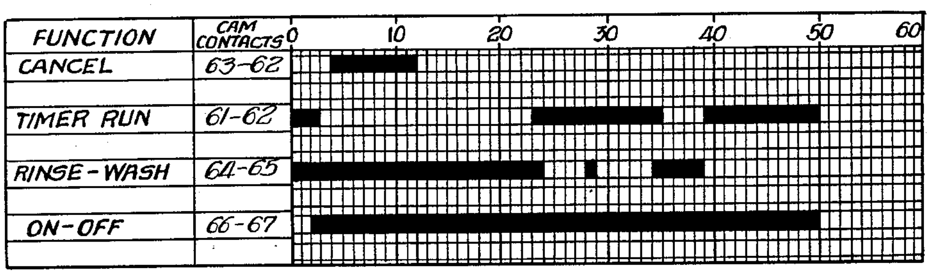
FIGURE 8 is a diagram illustrating the timer operation in a washing machine initiated by the token operated system of the present invention.

Referring now to FIGURE 8 there is illustrated the position of the timing switch contacts through a cycle of operation, the shaded areas indicating the periods in which the timer contact switches are closed. The timer contact switches are, of course, regulated by a conventional timing mechanism driven by timer motor 60, for opening and closing the switches at the proper interval.

After the timer motor 60 has been energized by relay switch 56, it begins to operate and after two intervals closes timer switch contacts 66, 67. Timer contact switches 66, 67 are in a circuit parallel to relay switch 56, so that after the timer contact switches 66, 67 have been closed the timer motor continues to operate under the control of its own timer switch contacts 66, 67 apart from the relay switch 56. Upon closing of the timer switches 66, 67, the washing machine operation proceeds under its own automatic control, apart from the circuits energized by token T.

It will be noted that the timer motor 60 is under the control of timer switch contacts 61, 62, since it is connected to power line $L_1$ through contacts 61, 62. After the timer motor has advanced three intervals contacts 61, 62 are open to de-energize the timer 60 and drive motor 80.

The fill solenoid 70, however, remains energized to operate a valve for introducing water into the machine until the float switch 71 indicates that the water level in the machine has reached a predetermined height. After the water level attains the predetermined height contact 72 is opened de-energizing solenoid 70, and contact 73 is closed. When float switch 71 closes contact 73 (as indicated by the dotted lines shown in FIGURE 7) the drive motor 80 and timer motor 60 are again energized to continue the operation.

After the timer motor 60 has operated through four intervals, the timer contacts 62, 63 are closed to energize a circuit for cancelling or invalidating the token T, such as by the heater 30. The heater is connected to power line $L_1$ through timer contacts 62, 63. The other side of the heater 30 is connected to power line $L_2$ through switch 25 (closed when a token is inserted in the receiver 10) and line 11. The heater cancels the card T by raising the temperature above the plasticizing point of the thermoplastic material of the base sheet. At plasticizing temperatures the card tends to contact, shrink, and distort. Referring to FIGURE 1 when the card T contracts and shrinks at the elevated temperatures created by heater 30, the arm 26 of switch 25 is returned to the dotted line position, opening switch 25. This de-energizes the heater. It does not affect, however, the washing cycle since the various units in the washing machine are now under the control of timer switches 66, 67.

During the washing cycle the timer switches 61, 62 and 64, 65 are opened and closed for energizing and de-energizing the timer and fill solenoid for various operations. At the completion of the washing cycle, the timer switch contacts 66, 67 are opened to de-energize the timer motor 60 and the other units of the washing machine, for example, fill solenoid 70 and drive motor 80. The washing cycle is thus stopped.

In addition to the system already described, another device is employed in order to prevent operation of the device by counterfeit objects inserted in the receiver 10. Electrical contacts *a* and *d* through *g* are connected to a separate tamper circuit. Referring to FIGURES 1 and 2 of the drawing, it will be noted that each of the electrical contacts *a* and *d* through *g* are connected together by jumpers on their respective terminals A and D through G to line 90 at terminal E.

Referring now to FIGURE 7 it will be seen that line 90 is connected to one side of the condenser 44 while electrical contact *b* is connected to the opposite side through line 46. It will be apparent that if a metal object is inserted in the receiver and touches electrical contact *b* together with any electrical contact *a* and *d* through *g*, the condenser 44 will be shorted and discharged to prevent the firing of neon gas discharge tube 50. The circuit for actuation of the relay to start the washing operation is thus prevented from operation. Furthermore, the correct contacts must be held closed for a period of time sufficient to charge condenser 44. It will be seen that random insertion of an electrical conductor in receiver 10 cannot accidentally start the washing cycle.

Even assuming that the correct electrical contacts *b* and *c* may be closed for a period of time without touching the remaining contacts *a* and *d* through *g*, the circuit for actuating relay 54 will not be energized since the switch 25 must also be closed. In this way an effective system is provided for preventing operation of the device by tampering.

It will be apparent that the electrical contacts *a* through g may be arranged in various designs and patterns to correspond to various designs and patterns on the token T. The leads 46, 47 and 90 on the terminals A through G may be varied to suit a particular arrangement on a particular card. From time to time it may be desirable to change the design on the face of the token and this can be accomplished quite readily by also changing the position of the leads on the terminals of the various contacts *a* through *g*.

From the foregoing it is believed operation of the device is apparent. If an operator desires a washing cycle, a token T, which may be purchased at a suitable place, is inserted in the slot 11 of receiver 10. Upon insertion of the token in the receiver, switch 25 is closed. Also a circuit is completed between electrical contacts *b* and *c* through the electrical conductive material S on the face of the token. The circuit through switch 25 and through the conductive material S between electrical contacts *b* and *c* energizes a time delay circuit for actuation of relay 54. After relay 54 is energized it remains energized through a holding circuit in order to institute the washing cycle.

The relay actuating circuit is from power line $L_1$, timer switch contacts 61, 62, rectifier 48, resistor $R_2$, electrical contacts *b*, *c*, with electrical conductive material S, and line 46 to one side of condenser 44. The other side of condenser 44 is connected to power line $L_2$ through line 41, switch 25, line 42, and resistor $R_1$. After the condenser has achieved a predetermined voltage after a predetermined time in accordance with well known principles, the neon gas tube in parallel with the condenser fires and illumines the photo-electric cell 52. When the photo-electric cell 52 is illuminated its resistance is reduced to a point which energizes the relay 54. The circuit for energizing the relay is from power line $L_1$, timer switch contacts 61, 62 and photo-electric 52 to one side of the relay 54. The other side of the relay is connected through line 42, switch 25, and line 41 to power line $L_2$. When the relay 54 has been energized, a holding circuit is completed by relay switch 57 which short circuits the photo-electric cell 52. The relay also closes a switch 56 which is connected to a number of units in an automatic washing machine for energizing automatic controls.

In the drawings and specification there has been set forth a preferred embodiment of the invention, and although specific terms are employed, these are used in a generic and descriptive sense only, and not for purposes of limitation. Changes in form and the proportion of parts as well as the substitution of equivalents are contemplated, as circumstances may suggest or render expedient, without departing from the spirit or scope of this invention as further defined in the following claims.

I claim:

1. In a control for a token operated device, a receiver, said receiver mounted for the reception of a token having on at least one surface electrically conductive portions in prearranged patterns, electrical contact members associated with said receiver for engaging a token when inserted, actuation means responsive to completion of a circuit between at least a pair of said electrical contact members and through the electrically conductive portions of said token for initiating operation of the device, said pair of electrical contact members positioned to engage the inserted token at prearranged locations corresponding to said prearranged pattern of electrically conductive portions, and circuit means connected to at least one other of said electrical contact members for preventing initiation of the device when an improper electrical conductor is introduced into said receiver.

2. In a token operated device, a receiver, said receiver mounted for reception of a token with electrically conductive portions for completion of a circuit therethrough, electrical contact members associated with said receiver for frictional engagement with said electrically conductive portions on the surface of the token when inserted, time delay means responsive upon insertion of a token and after a predetermined time of completion of the circuit between said electrical contact members through the electrically conductive portions of said token for initiating actuation of the device, holding means responsive to actuation of the device for maintaining operation of the device without the token after actuation has been intiated, and means responsive to actuation of the device for terminating operation of said device after a cycle.

3. In a token operated device, a receiver for reception of a token, a token with electrically conductive portions for completion of a circuit therethrough for insertion in said receiver, electrical contact members associated with said receiver for frictional engagement with said electrically conductive portions on the surface of the token when inserted, switch means for energizing said device, means responsive to insertion of a token and after a predetermined time of completion of the circuit between said electrical contact members through the electrically conductive portions of said token for actuating said switch means, holding means responsive to actuation of said switch means for maintaining operation of the device without the token after actuation has been initiated, and means responsive after actuation of said switch means for terminating operation of said device following a cycle.

4. In a token operated device, a receiver for reception of a token, a token with electrically conductive portions for completion of a circuit therethrough for insertion in said receiver, electrical contact members associated with said receiver for frictional engagement with said electrically conductive portions of a proper token when inserted, switch means for energizing said device, time delay means responsive upon insertion of the token in said receiver after a predetermined time of maintaining a circuit between said electrical contact members and through the electrically conductive portions of said token for actuating said switching means to initiate energization of said device, holding means responsive upon actuation of said switch means for maintaining operation of the device without the token after actuation has been initiated, and means responsive after actuation of said switch means for terminating operation of said device.

References Cited in the file of this patent

UNITED STATES PATENTS

| | | |
|---|---|---|
| 1,705,859 | Gilbert | Mar. 19, 1929 |
| 2,073,904 | Osteen | Mar. 16, 1937 |
| 2,176,110 | Strash | Oct. 17, 1939 |
| 2,714,201 | Whitehead | July 26, 1955 |
| 2,794,869 | Noregaard | June 4, 1957 |